United States Patent Office 2,818,394
Patented Dec. 31, 1957

2,818,394

PREPARATION OF PLATINUM-CONTAINING CATALYSTS

Vladimir Haensel, Hinsdale, and Maurice J. Murray, Naperville, Ill., assignors to Universal Oil Products Company, Des Plaines, Ill., a corporation of Delaware No Drawing. Application May 24, 1954
Serial No. 432,057

13 Claims. (Cl. 252—466)

This invention relates to the manufacture of catalysts and more particularly to the manufacture of platinum-containing catalysts.

In another aspect, the present invention relates to the use of platinum-containing catalysts prepared by a specific method of procedure.

Platinum-containing catalysts and various methods of manufacture have heretofore been suggested. These catalysts have been of limited commercial acceptance because of the high cost thereof. The present invention is based on the discovery that exceptionally good catalysts may be prepared by the specific method of preparation to be hereinafter described in detail.

In one embodiment the present invention relates to a method of preparing a platinum-containing composite which comprises commingling a refractory inorganic oxide with a platinum-containing solution, drying and calcining said composite, subsequently commingling the calcined composite with a platinum-containing solution and drying and calcining the resultant composite.

In another embodiment the present invention relates to a method of manufacturing a catalyst which comprises combining a halogen with alumina, commingling therewith a platinum-containing solution, calcining the composite, subsequently commingling the calcined composite with a platinum-containing solution and calcining the resultant final catalyst.

In a specific embodiment the present invention relates to a method of manufacturing a catalyst which comprises combining a halogen with a support in an amount of from about 0.1% to about 8% by weight of said support on a dry basis, commingling the resultant composite at least twice with a platinum-containing solution with a calcination between each commingling operation, and calcining the resultant catalyst.

In still another embodiment, the present invention relates to a process for reforming a gasoline fraction which comprises subjecting said gasoline fraction to contact with a catalyst prepared as herein set forth.

It has been found that exceptionally good catalysts are prepared in accordance with the novel features of the present invention. While these catalysts may contain larger concentrations of platinum which may range up to about 10% by weight, or more of the support, it has been found that especially good catalysts may be prepared to contain from as low as about 0.01% to about 1% by weight of platinum. Catalysts of these low platinum concentrations are particularly preferred in the present invention because of the considerably lower cost of the catalysts, thus enhancing the attractiveness of the catalysts for use in commercial processes.

It has been found that alumina shows unexpected advantages for use as a supporting component for the low platinum concentrations, apparently due to some peculiar association of the alumina with the platinum, either as a chemical combination or as a physical association. Platinum or other inorganic refractory oxide supports such as silica, alumina-silica, alumina-titania, and alumina-boron oxide also shows catalytic activity, and the method of our invention for compositing platinum with alumina may also be used for compositing platinum with these other components but not necessarily with equivalent results.

To further improve these catalysts, it is preferred that the final catalyst contain halogen in specific concentrations. It has been found that the presence of halogen within a specific range enhances the activity of the catalyst. It is believed that the halogen enters into some chemical combination or loose complex with the alumina and/or platinum and thereby seems to improve the final catalyst.

While any of the halogen ions will serve to effect improved results, fluoride ions are particularly preferred, and next in order are the chloride ions, while bromide and iodide ions are generally less preferred. Mixtures of the halogens may also be used and their concentrations will lie within the ranges herein specified. It is understood that while any of the halogens will serve to effect an improvement, they are not necessarily equivalent.

As hereinbefore set forth, the catalyst of the present invention is prepared by a specific method of procedure. It is an essential feature of the present invention that the alumina, either with or without combined halogen, be commingled with at least two solutions of a platinum compound with a calcination between each commingling step. For example, when it is desired to prepare a catalyst comprising alumina and 0.3% platinum a method of procedure as follows may be used in accordance with this invention.

The alumina may be commingled with an aqueous solution of chloroplatinic acid in an amount to form a composite containing about 0.1% by weight of platinum. This composite is then dried and heated or calcined, and the composite commingled with an aqueous solution of chloroplatinic acid in an amount to add 0.1% by weight of platinum to the composite so that the intermediate composite now has 0.2% by weight of platinum. The composite containing 0.2% by weight of platinum is then heated and subsequently commingled with a platinum-containing solution which again may be chloroplatinic acid or it may be any other platinum-containing solution in an amount to add 0.1% by weight of platinum to the composite so that the final composite contains the desired amount of platinum, that is 0.3% by weight of platinum. The final composite is subsequently calcined to produce the final catalyst.

We have found that the catalyst produced according to our invention has high activity, and further the catalyst is very stable in use and affords a long catalyst life. The exact reason why the catalyst exhibits high activity, especially when the catalyst is used for the reforming of a gasoline fraction, is not completely known. Platinum is a very unique metal and has very unique catalytic activities and also the problems of preparing a good platinum-containing catalyst are very specific to platinum. One theory is that the location of catalytic activity is limited to points where the patinum is in direct combination or assocation with the alumina. When the entire amount of platinum that is desired in the catalyst is placed thereon in one commingling or impregnation step, there is a tendency for the platinum crystals to grow in size and only a limited amount of platinum is in contact with the alumina. A platinum crystal usually is of a cubic structure, and if a cubic structure is permitted to grow on a surface, it would appear that the only active constituents are those that are located on the outside of the cubic structure and at the point of contact with the surface of the support. When the alumina is impregnated with a platinum-containing solution containing the finally desired amount of platinum, an examination of the final catalyst usually indicates that the platinum crystals are of substantially the same size indicating a relatively stable configuration which is achieved in the original impregnation or by subsequent migration of the platinum particles during drying and/or calcination. Therefore, if the alumina is impregnated with but a fraction of the amount of platinum finally desired on the catalyst, the platinum will uniformly distribute itself through the alumina and upon drying and heating or calcination a relatively uniform catalyst containing substantially uniformly sized platinum crystals is obtained. Now if this calcined composite is further commingled or impregnated with a platinum-containing solution, it appears that the new platinum brought in with the platinum-containing solution does not tend to associate itself with the platinum already on the catalyst and increase the crystal size of the existing platinum crystals, but it appears that the new platinum preferably associates itself with the alumina and begins its own new crystal structure. Therefore, by this method there are many more points of contact of the alumina with the platinum. Whatever the reason may be, we have found that an excellent catalyst results when using the method of compositing the platinum with the support as herein set forth, and we do not intend our invention to be limited to the above theory.

One of the main features of the present invention is, therefore, a multiple submerging, commingling or impregnation of the support with a platinum-containing solution with a heating treatment or calcination between each impregnation. Different platinum-containing solutions may be used for each separate impregnation, however, for simplicity of preparation the same solution may be used. For example, the support may first be treated with an aqueous solution of chloroplatinic acid followed by a heat treatment, and subsequently the composite may be commingled with a colloidal suspension of platinum sulfide. As hereinbefore mentioned, an aqueous solution of chloroplatinic acid may be used for both of the impregnation steps. The invention is not limited to two impregnations but the method of preparing or compositing the platinum with the support may be used for any number of commingling or impregnation steps until the desired amount of platinum is obtained in the catalyst.

For the purposes of the present specification and claims, the use of the term "platinum" is intended to include both the combined platinum and the free platinum. As hereinbefore set forth, it is believed that the platinum is present in a combined state, however, in some stage during preparation or use of the catalyst, the platinum may be present as free platinum. The use of the term "halogen," "fluorine" or "chlorine" is intended to mean the combined halogen as it is believed that the halogen is combined with the alumina and/or platinum.

As hereinbefore set forth, the final catalyst contains from about 0.01% to about 1% by weight of platinum, and this amount of platinum is put into the catalyst in a series of steps. The preferred catalyst also contains from about 0.1% to about 8% by weight of halogen. When the halogen comprises fluorine, it is present in an amount of from about 0.1% to about 3% by weight, and when the halogen comprises chlorine, it is present in an amount of from about 0.1% to about 8% by weight. In another embodiment the halogen will comprise a mixture of combined chlorine and combined fluorine, the total thereof being within the range of from about 0.1% to about 8% by weight.

Alumina is a particularly preferred support for compositing with the platinum because it appears to show improved advantages for use as a supporting component for the low platinum concentrations apparently due to some peculiar association of the alumina with the platinum, either as a chemical combination or as a physical association. It has been found that the combination of alumina and low platinum concentration is a very active catalyst and also has a long catalyst life, especially when the catalyst is prepared according to the method herein set forth. After these long periods of service, the catalyst may show a drop in activity, and it further has been found that the particular combination of alumina and platinum renders the catalyst susceptible to ready regeneration. The novel method of compositing platinum also may be used with other supports including silica, zinc oxide, magnesia, zirconia, thoria, etc. as well as supports comprising two or more components such as silica-alumina, silica-magnesia, silica-zirconia, silica-thoria, silica-zinc oxide, silica-alumina-magnesia, silica-alumina-zirconia, silica-alumina-thoria, silica-alumina-zinc oxide, etc. The use of the multiple impregnation method in compositing platinum with the support offers improved advantages in uniformly distributing the platinum throughout the support which in turn offers advantages in the reforming operation which will hereinafter be set forth in detail.

As an essential feature of the present invention, the support is composited with the platinum in a series of impregnations. A particularly suitable method of impregnation is by means of a solution of a suitable platinum compound. A particularly satisfactory method of impregnating the support comprises the use of an aqueous solution of chloroplatinic acid. In a preferred embodiment the aqueous solution of chloroplatinic acid is added to the support, and the mixture is allowed to stand, preferably with suitable agitating so that thorough mixing is obtained and even distribution throughout the support is effected.

It is understood that any suitable solution of platinum may be used in accordance with the present invention. Chloroplatinic acid generally is preferred because it is more readily available. Solutions of other platinum-containing compounds may be employed including those of ammonium platinum chloride, trimethylbenzyl ammonium platinum chloride, tetramine platino chloride, ammonium platino nitrate, etc. It is understood that when desired other than aqueous solutions may be employed, and this is particularly useful where the platinum compound is not readily water soluble.

As hereinbefore set forth, it is an essential feature of the present invention that the impregnation be performed in a series of steps with a heating or calcination treatment between each impregnation step.

In one embodiment of the invention the support is formed into particles of uniform size and shape prior to compositing the platinum therewith. In this embodiment of the invention, the particles of uniform size and shape are subjected to calcination at a temperature of above about 800° F. and preferably within the range of from about 1000° F. to about 1400° F. for a period of from about 1 to 8 hours or more. The temperature and time of heating are correlated; that is, shorter times are employed with higher temperatures and longer times are employed with lower temperatures. On the other hand, the final composite containing platinum compound should not be heated at a temperature above about 1100° F. and preferably is calcined in air at a temperature of from about 500° F. to about 1100° F. for a period of from about 1 to 12 hours or more as hereinbefore set forth. In another embodiment of the invention the platinum is composited with the support while the latter is in a wet condition or after only partial drying thereof. In still another embodiment of the invention the support may be formed into particles of uniform size and shape, and the platinum is composited therewith before the support is subjected to partial or substantially complete drying.

A preferred method of preparing alumina is to commingle a suitable reagent, such as ammonium hydroxide, ammonium carbonate, etc., with a salt of aluminum such as aluminum chloride, aluminum nitrate, aluminum acetate, etc. in an amount to form aluminum hydroxide which, upon drying is converted to alumina. In the interest of simplicity, the aluminum hydroxide is referred to as alumina in the present specification and claims in order that the percentages are based on the alumina free of combined water. It has been found that aluminum chloride is generally preferred as the aluminum salt, not only for convenience in subsequent washing and filtering procedures, but also because it appears to give best results.

After the alumina has been formed, it is generally washed to remove soluble impurities. Usual washing procedures comprise washing with water, either in combination with filtration or as separate steps. It has been found that filtration of the alumina is improved when the wash water includes a small amount of ammonium hydroxide. The severity of washing will depend upon the particular method employed in preparing the catalyst. In one embodiment of the invention, the alumina is thoroughly washed with a suitable amount of water and preferably water containing ammonium hydroxide to reduce the chlorine content of the alumina to below about 0.1%. In another embodiment of the invention this washing may be selective to retain chlorine in an amount of from about 0.1% to about 8% by weight of the alumina on a dry basis. In accordance with this method of preparing the catalyst, the chlorine is obtained from the original aluminum chloride and is retained in the alumina, thus avoiding the necessity of adding the halogen in a later step of catalyst preparation. However, it generally is difficult to control the washing procedure to retain exactly the desired amount of halogen and, for this reason, it usually is preferred to wash the alumina to remove substantially all of the chlorine and thereafter add the halogen in a controlled amount. The addition of the halogen in this manner permits better control of the amount of halogen being added. The washing may also be selective to retain the chlorine in an amount constituting a portion of the total halogen desired, and the remaining portion of the halogen is then added in a subsequent step. In this method the halogen may comprise the same halogen or a mixture of two different halogens as, for example, chlorine and fluorine.

Alumina prepared in the above manner, after washing and filtration, is generally recovered as a wet cake. In a preferred embodiment of the present invention, the halogen, when added, is introduced at this stage of the catalyst preparation, the composite is dried to reduce the same to a moisture content of about 30%, which generally requires drying at a temperature of from about 200° F. to about 500° F. for a period of from about 2 to 24 hours or more. In one embodiment the composite is formed into particles of uniform size and shape as by pilling, extrusion or other suitable methods. In another embodiment the alumina may be formed into particles of uniform size and shape and the halogen thereafter added. In still another embodiment the halogen and/or platinum addition may be effected prior to forming the composite into particles of uniform size and shape.

Alumina spheres may be continuously prepared by passing droplets of an aluminum sol into an oil bath maintained at an elevated temperature and retaining the droplets in the oil bath until the droplets set to gel spheres. The spheres are continuously withdrawn from the oil bath and immediately thereafter aged prior to being contacted with water or aqueous solution.

Silica may be prepared by reacting a suitable acid such as sulfuric acid, hydrochloric acid, etc. with an alkali metal silicate and particularly water glass under conditions to precipitate silica. In another embodiment of the invention the silica may be prepared as substantially spheroidal gel particles by dropping a suitable mixture of acid and alkali metal silicate into a bath of water immiscible suspending medium, such as hydrocarbon oil, the depth and temperature of the suspending medium being controlled so that droplets form into spheroidal particles during passage through the suspending medium. In one embodiment a layer of water may be disposed beneath the oil suspending medium, and the spherical particles may be withdrawn by means of a circulating stream of water from the forming zone into suitable washing, drying and/or calcining equipment as desired. When the support comprises other metal oxides as hereinbefore set forth, they may be prepared in any suitable manner, including the formation of spherical particles. In another embodiment when the support comprises two or more components, they may be prepared by separate, successive or cojoint precipitation or gelation. It is understood that the detailed description set forth in connection with the preparation and further handling of alumina also may apply to other supports.

Regardless of the stage of catalyst preparation at which the halogen is added, the halogen may be incorporated therein in any suitable manner. However, the halogen must be added in a form which will readily react with the support in order to obtain the desired results and also must not leave undesired deposits in the catalyst. A preferred method of adding the halogen is in the form of an acid, such as hydrogen fluoride, hydrogen chloride, hydrogen bromide and/or hydrogen iodide. Hydrogen fluoride is preferably added as an aqueous solution for ease in handling and for control of the specific amount to be added. Another satisfactory source to be used for adding the halogen is the volatile salts, such as ammonium fluoride, ammonium chloride, etc. The ammonium ions will be removed during the subsequent heating of the catalyst and, therefore, will not leave undesirable deposits in the catalyst. In still another method, the halogen may be added as fluorine, chlorine, bromine and/or iodine, but, in view of the fact that the halogens are normally more difficult to handle, it generally is preferable to utilize them in the form of a solution for ease in handling. In some cases the inclusion of certain components will not be harmful but may be beneficial, and in these cases the halogen may be added in the form of suitable salts.

The concentration of halogen in the finished catalyst will be within the range of from about 0.1% to about 8% by weight of the support on a dry basis. Fluorine appears to be more active and, therefore, will be used within the range of from about 0.1% to about 3% by weight of the support on a dry basis. Chlorine will be used within the range of from about 0.1% to about 8%. It appears that halogen concentrations below these lower limits do not give the desired improvement and on the other hand, concentrations of halogen above the upper limits adversely affect the selectivity of the catalyst, thus catalyzing side reactions to an extent greater than desired.

As hereinbefore set forth, it is essential that the platinum compound be incorporated into the support in a series of impregnation steps with a heating or calcination between each impregnation. In one embodiment of the present invention the support, either with or without halogen, is formed into particles of uniform size and shape prior to the addition of the platinum compound. When the support is to be formed into particles of uniform size and shape by pilling, the support, with or without halogen, is dried at a temperature of from about 200° F. to about 500° F. for a period of from about 2 to 24 hours or more. The partially dried cake is ground and a suitable lubricant is added, such as stearic acid, rosin, hydrogenated coconut oil, graphite, etc., after which the composite is formed into pills in any suitable pelleting machine. Particularly satisfactory particles comprise cylindrical pills of a size ranging from about 1/16" x 1/16" to 1/4" x 1/4" or thereabouts. Pills of uniform size and shape may also be formed by extrusion or other suitable methods. As hereinbefore set forth, the pills, prior to the addition of the platinum compound, may be calcined at a temperature above 800° F. In some cases, the lubricant will be removed during the high temperature heating. In other cases as, for example, when graphite is used as the lubricant, the separate high temperature heating step may be omitted, and the effective heat treatment of the catalyst may be obtained in the plant before or during processing of the hydrocarbons.

In accordance with the invention the support is impregnated with a platinum-containing solution, heated or calcined, impregnated with a platinum-containing solution again, and this composite may then be calcined and be ready for use as a catalyst or the composite may be heated or calcined and subjected to one or more impregnations with heating or calcination steps between the impregnations.

It is essential that after the first impregnation and after each subsequent impregnation that the support be heated or calcined at an elevated temperature. The heating should not exceed 1100° F. after impregnation with the platinum since temperatures above this have been found to adversely affect the activity of the platinum-containing catalyst. The preferred heating temperatures are from about 500° F. to about 1100° F. and the time of heating is inversely proportional with the temperature employed, that is, at higher temperatures shorter heating times are employed and likewise at lower temperatures longer heating times are employed. The time of heating, however, will usually fall within the range of from about one-half to about twelve hours or more and preferably from about one hour to about six hours. This heating operation between the impregnation is necessary in order to fix the platinum on the catalyst, that is, to prevent migration of the platinum and to fix the crystal structure. Contact crystals will now continue to grow in this manner. The new platinum entering into the catalyst composite in the subsequent impregnation seeks out other support, that is, support not already in contact with platinum, and in this manner more of the platinum is in contact with the support which, as hereinbefore mentioned, is preferred. The heating may be performed in air or other oxidizing gas and in this manner the platinum usually results in an oxidized state. It is preferred, however, that the heating be performed in a reducing gas and, therefore, the heating may be characterized as a reduction treatment. One method is to subject the composite to reduction with hydrogen or hydrogen containing gas at a temperature of from about 500° F. to about 1100° F. The reduction treatment is preferred to heating in the presence of an oxidizing or an inert gas since the reduction treatment appears to more definitely fix the platinum crystals and further migration does not tend to take place. Besides hydrogen other reducing means may be used, for example, the reduction may take place in the presence of a hydrocarbon, hydrazine, ammonia, sulfur dioxide, etc.

The platinum may be added to the alumina before it is dried and calcined but preferably is added to the alumina after drying and calcining and after the halogen has been composited therewith. Preferably, the platinum is added in the form of a solution, and chloroplatinic acid solution is generally preferred because of its ready availability. As hereinbefore mentioned, solutions of other platinum-containing compounds may be employed including those of ammonium-platinum chloride, trimethylbenzyl ammonium platinum chloride, tetramino platino chloride, ammonium platino nitrate, dinitro diamino platinum, etc. When the platinum is to be added to the alumina in the wet condition, that is, before drying and calcining, the platinum may be added in the form of a colloidal suspension of a platinum sulfide in water, as this method results in uniform distribution of the platinum throughout the alumina. In this method, hydrogen sulfide is added to an aqueous solution of chloroplatinic acid, and the addition of hydrogen sulfide is continued until the solution reaches a constant coloration; that is, will not change color upon the addition of more hydrogen sulfide. The chloroplatinic acid solution is normally light yellow and, upon addition of hydrogen sulfide gas, turns to a dark brown color. Apparently the chloroplatinic acid and hydrogen sulfide react to form one or more complex chemical compounds. The brown solution of chloroplatinic acid and hydrogen sulfide may then be commingled with the slurry of wet alumina in any suitable manner.

As hereinbefore set forth, a preferred method is to add the platinum to the alumina after the latter has been dried and calcined. In this method of compositing the platinum, an aqueous solution of chloroplatinic acid or other suitable platinum-containing compound is commingled with the alumina particles in the presence of ammonium hydroxide. A particularly preferred method is to commingle chloroplatinic acid with ammonium hydroxide to form a mixture having a pH within the range of from about 5 to about 10, preferably within the range of from about 8 to about 10, and then commingle this mixture with the alumina or alumina-halogen particles. It is understood that the ammonium hydroxide or platinum compound may be added first to the alumina and then the other compounds are added and that these compounds may be composited either as cold or hot solutions. After the platinum has been composited in the catalyst as hereinbefore set forth, it is essential that the catalyst be heated and subsequently again composited with platinum. After the desired amount of platinum has been composited with the support in this manner, the final composite should not be calcined at a temperature above about 1100° F. and preferably is calcined at a temperature of from about 600° F. to about 1000° F. for a period of from about 2 to 12 hours or more. Therefore, in a preferred embodiment the alumina-halogen composite is calcined at a temperature of from about 800° F. to about 1400° F. and after any amount of platinum is composited therewith, that is after a fraction or all of the platinum is composited therewith, the composite is further calcined at a temperature of from about 600° F. to about 1100° F. Preferably, this final calcination or heating is effected in the presence of air, although in one embodiment of the invention the catalyst may be calcined in the presence of hydrogen and, in still another embodiment of the invention, may be calcined first in the presence of air and then in the presence of hydrogen, or the reverse procedure may be utilized.

Although the catalyst of the present invention will have a long life, it may be necessary to regenerate the catalyst after long periods of service. The regeneration may be effected by treatment with air or other oxygen-containing gas to burn the carbonaceous deposits therefrom. In general, it is preferred to control the regeneration temperature not to exceed about 1100° F. and preferably the regeneration is effected at a temperature within the range of from about 600° F. to about 800° F.

The improved catalyst of the present invention may be employed in any process for which platinum is a catalyst. The improved catalyst is particularly satisfactory for reforming operations in which a saturated gasoline, such as straight run gasoline, natural gasoline, etc. is subjected to conversion to produce a reformed gasoline of improved antiknock properties. The saturated gasoline generally comprises a mixture of naphthenic and paraffinic hydrocarbons, and the reforming operation effects dehydrogenation of the naphthenic hydrocarbons to aromatics, cyclization and dehydrogenation of the paraffinic hydrocarbons to aromatics, as well as to effect a controlled type of cracking which is selective both in quality and in quantity. In addition, other reactions may occur such as isomerization, hydrogen transfer, etc. The controlled or selective cracking is desirable because it further increases the octane number of the reformed gasoline, produces a gasoline of higher volatility and also converts the higher boiling fractions to lower boiling fractions within the range of gasoline. However, this cracking must be controlled because excessive cracking produces excessive normally gaseous products and also excessive carbonaceous deposits on and deactivation of the catalyst. The improved catalyst of the present invention is particularly desirable for reforming operations because the catalyst effects the desired aromatization and controlled cracking under the selected conditions of operation.

The catalyst of the present invention may also find utility in the treatment of higher boiling saturated fraction such as kerosene, gas oil, etc. In many cases it is desirable to produce from kerosenes a highly aromatic product useful as a solvent, and the present invention is readily applicable for this purpose. The gasoline, kerosene, etc. fractions comprise a mixture of different hydrocarbons and, in accordance with the invention, the full boiling range fraction or any selected fraction thereof may be subjected to the desired conversion. When a selected fraction is so treated, it may be blended, all or in part, with the other fraction.

The catalyst of the present invention may prove particularly useful for destructive hydrogenation or hydrocracking reactions in which hydrocarbons and particularly oil heavier than gasoline is subjected to conversion to produce lower boiling products and particularly gasoline. For cracking reactions, it is preferred that the halogen content of the catalyst be within the upper limits of the ranges hereinbefore set forth because these higher halogen catalysts are more active for effecting decomposition reactions.

The catalyst of the present invention may also be useful for effecting non-destructive hydrogenation reactions including the hydrogenation of unsaturated aliphatic hydrocarbons, such as mono-olefins, di-olefins, etc., to form the corresponding saturated hydrocarbons, hydrogenation of unsaturated cyclic hydrocarbons, hydrogenation of unsaturated alcohols, ketones, acids, etc. Other reactions in which these catalysts may find utility include oxidation as, for example, oxidation of olefins to form the corresponding oxide, such as the oxidation of ethylene to ethylene oxide, propylene to propylene oxide, etc., oxidation of alcohols, ketones, etc. These and other oxidation reactions are well known in the art, and it is within the scope of the present invention to effect these reactions in the presence of the catalysts prepared as disclosed herein. In reactions involving hydrogenation, oxidation or condensation, it is preferred that the halogen content of the catalyst be within the lower limits of the ranges hereinbefore specified in order to minimize side reactions.

As hereinbefore set forth, selected processing conditions are required depending upon the particular reaction desired. For reforming of straight run gasoline the temperature employed should be within the range of from about 600° F. to about 1000° F., the pressure within the range of from about 50 to about 1000 pounds per square inch, and the weight hourly space velocity within the range of from about 0.5 to about 20. For dehydrogenation of normal butane the temperature should be within the range of from about 800° F. to about 1100° F., the pressure from about atmospheric to about 50 pounds per square inch, and the gaseous hourly space velocity from about 200 to about 5000. For hydrogenation reactions the temperature may range from atmospheric to about 600° F., the pressure from about 100 to about 3000 pounds or more, and the weight hourly space velocity from about 0.5 to 5. The weight hourly space velocity is defined as the weight of oil per hour per weight of catalyst in the reaction zone.

In one embodiment of the process sufficient hydrogen will be produced in the reforming reaction to furnish the hydrogen required in the process and, therefore, it may be unnecessary to either introduce hydrogen from an extraneous source or to recycle hydrogen within the process. However, it usually will be preferred to introduce hydrogen from an extraneous source, generally at the beginning of the operation, and to recycle hydrogen within the process in order to be assured of a sufficient hydrogen atmosphere in the reaction zone, which is within the range of from about 0.5 to about 20 mols of hydrogen per mol of hydrocarbon. In some cases the gas to be recycled will contain hydrogen sulfide, introduced with the charge or liberated from the catalyst, and it is within the scope of the present invention to treat the hydrogen-containing gas to remove hydrogen sulfide or other impurities before recycling the hydrogen within the process.

The process of the present invention may be effected in any suitable equipment. A particularly suitable process comprises the well known fixed bed system in which the catalyst is disposed in a reaction zone and the hydrocarbons to be treated are passed therethrough in either upward or downward flow. The products are fractionated to separate hydrogen and to recover the desired products. As hereinbefore set forth, the hydrogen may be recycled for further use in the process. Other suitable units in which the process may be effected include the fluidized type process in which the hydrocarbons and catalysts are maintained in a state of turbulence under hindered settling conditions in a reaction zone, the compact moving bed type in which the catalyst and hydrocarbons are passed either concurrently or countercurrently to each other, and the suspensoid type of operation in which the catalyst is carried into a reaction zone as a slurry in the hydrocarbon oil.

The following examples are introduced to further illustrate the novelty and utility of the present invention but not with the intention of unduly limiting the same.

*Example I*

A catalyst containing alumina, 0.4% platinum and 0.5% fluorine was prepared as follows. An alumina sol was prepared by digesting an aqueous solution of aluminum chloride hexahydrate with aluminum metal at a temperature of approximately 210° F. A 4.8% solution of hydrogen fluoride was added in amount so that the final catalyst produced contained 0.5% fluorine by weight. The resultant sol was commingled with an equal volume of a hexamethylene tetramine solution, and the mixture was dropped into an oil bath maintained at an elevated temperature of approximately 203° F. Droplets of the sol when passing through the oil bath set into firm gel spheres. The resultant spheres are transferred to another zone wherein they are aged in oil at a temperature of approximately 200° F. for 16 hours and then the spheres were separated from the oil. The oil aged spheres were subsequently aged in a 5% ammonium hydroxide solution at approximately 207° F. for 5 hours after which the mixture is allowed to cool to room temperature. The spheres were then withdrawn from the ageing solution and then are washed with water containing a small amount of ammonium hydroxide after which the spheres were dried in a humid atmosphere at 230° F. for about 5 hours then at 285° F. for about one and one-half hours and finally 300° F. for 3 hours. The spheres were subsequently calcined at 1200° F. for 3 hours.

These spheres were divided into three portions and one portion is used to prepare the catalyst of this example and the other two portions were used to prepare the catalysts further explained in the two subsequent examples.

A platinum containing solution was prepared by adding 0.375 gram of platinum, as chloroplatinic acid, in 600 ml. of water. This solution was made ammoniacal by the addition of 2 ml. of ammonium hydroxide. This solution was poured over 300 grams of the calcined alumina in combined fluorine spheres as prepared above. After standing one-half hour, the mixture was dried on a water bath and then calcined in a stream of air at 140° F. and the temperature was slowly increased to 932° F. and maintained at 932° F. for 3 hours. The catalyst was further subjected to a reduction in a hydrogen atmosphere for one hour at 932° F. This reduced catalyst was impregnated again in an ammoniacal solution of chloroplatinic acid. After standing one hour the mixture was again dried and calcined in a stream of air at 932° F. for 3 hours. After calcining the catalyst in air the catalyst was reduced with hydrogen for one hour at 932° F. The reduced catalyst was impregnated a third time with an ammoniacal solution of chloroplatinic acid. The final catalyst was calcined in air at 932° F. for 3 hours.

This catalyst called catalyst A was used for the dehydrogenation of cyclohexane. The catalyst was placed in a fixed bed reactor and cyclohexane passed therethrough. The inlet temperature to the catalyst bed was maintained at 900° F. The effluent was cooled and the liquid separated from the gas form during the reaction and collected. The liquid was analyzed to check the amount of aromatics formed from the cyclohexane in the presence of the catalyst. A standard method of determining the aromatic content of a liquid is to check its dispersion. The liquid dispersion @ 20° C. for the liquid product using catalyst A was 103.5.

*Example II*

A catalyst of the same composition of the catalyst as was prepared in Example I was again prepared for this present example and is termed catalyst B. Catalyst A was reduced by subjecting to the platinum-containing spheres to a heating or calcination step in the presence of hydrogen. As mentioned in the specification other means of reducing the spheres may be used. Instead of using the hydrogen reduction of Example I the platinum-containing spheres were reduced with a solution of 25 ml. of 85% hydrazine hydrate diluted to 500 ml. After the catalyst had soaked in this solution for one-half hour, it was dried and calcined at 932° F. thus instead of hydrogen reduction treatment used in Example I a hydrazine hydrate reduction was employed. As in Example I after the third impregnation, the catalyst was dried and calcined in air at 932° F. for 3 hours.

Catalyst B was employed for the conversion of cyclohexane into benzene at the same conditions employed in Example I. An analysis of the liquid product gave a liquid dispersion @ 20° C. of 103.3.

*Example III*

A third portion of the calcined alumina-combined fluorine spheres as prepared in Example I were impregnated once with an ammoniacal solution of chloroplatinic acid, that is, the concentration of platinum in the impregnating solution was sufficient to prepare a catalyst containing the same amount of platinum which catalyst A and catalyst B had deposited thereon by three impregnations. This catalyst was dried and calcined at 932° F. in air for 3 hours. This catalyst is termed catalyst C. Catalyst C was used for the conversion of cyclohexane into benzene at the same conditions as were employed in Examples I and II. The liquid dispersion @ 20° C. was only 102.8.

Catalyst A produced a product having a liquid dispersion of 103.5, catalyst B produced a product having a liquid dispersion of 103.3 while catalyst C produced a liquid product having a dispersion of only 102.8. It is thus seen that the multiple impregnation methods or that is compositing the support with platinum by a series of impregnations with intermediate calcinations produced a catalyst which has higher activity.

We claim as our invention:

1. In the compositing of platinum with a refractory inorganic oxide support, the method which comprises impregnating the support with platinum-containing solution in a series of stages and, after each of a plurality of said stages, heating the impregnated support, first in an oxidizing atmosphere and then in a reducing atmosphere, at from about 500° F. to about 1100° F.

2. In the compositing of platinum with a refractory inorganic oxide support, the method which comprises impregnating the support with platinum-containing solution in a series of at least two stages and, after each of the first and second stages, heating the impregnated support, first in an oxidizing atmosphere and then in a reducing atmosphere, at from about 500° F. to about 1100° F.

3. In the compositing of platinum with a refractory inorganic oxide support, the method which comprises impregnating the support with platinum-containing solution in a series of three stages, heating the impregnated support after each of the first and second stages at from about 500° F. to about 1100° F. first in an oxidizing atmosphere and then in a reducing atmosphere, and calcining the impregnated support from the third stage.

4. The method of claim 1 further characterized in that said refractory inorganic oxide comprises alumina.

5. The method of claim 1 further characterized in that the platinum-containing solution employed in at least one of said stages comprises chloroplatinic acid.

6. The method of claim 1 further characterized in that each of the platinum-containing solutions comprises chloroplatinic acid.

7. The method of claim 1 further characterized in that said reducing atmosphere comprises hydrogen.

8. The method of claim 1 further characterized in that said reducing atmosphere comprises hydrazine hydrate.

9. The method of claim 2 further characterized in that said refractory inorganic oxide comprises alumina.

10. The method of claim 2 further characterized in that at least one of the platinum-containing solutions comprises chloroplatinic acid.

11. The method of claim 2 further characterized in that each of the platinum-containing solutions comprises chloroplatinic acid.

12. The method of claim 2 further characterized in that said reducing atmosphere comprises hydrogen.

13. The method of claim 2 further characterized in that said reducing atmosphere comprises hydrazine hydrate.

References Cited in the file of this patent

UNITED STATES PATENTS

| | | |
|---|---|---|
| 2,479,109 | Haensel | Aug. 16, 1949 |
| 2,479,110 | Haensel | Aug. 16, 1949 |
| 2,643,980 | Houdry | June 30, 1953 |